US009019979B2

(12) United States Patent
Miki et al.

(10) Patent No.: US 9,019,979 B2
(45) Date of Patent: Apr. 28, 2015

(54) RADIO BASE STATION APPARATUS AND MOBILE TERMINAL

(75) Inventors: Nobuhiko Miki, Kanagawa (JP); Yoshihisa Kishiyama, Kanagawa (JP); Mamoru Sawahashi, Kanagawa (JP)

(73) Assignee: NTT DOCOMO, INC., Tokyo (JP)

( * ) Notice: Subject to any disclaimer, the term of this patent is extended or adjusted under 35 U.S.C. 154(b) by 639 days.

(21) Appl. No.: 13/002,685

(22) PCT Filed: Jul. 7, 2009

(86) PCT No.: PCT/JP2009/062337
§ 371 (c)(1),
(2), (4) Date: Mar. 24, 2011

(87) PCT Pub. No.: WO2010/004976
PCT Pub. Date: Jan. 14, 2010

(65) Prior Publication Data
US 2011/0170439 A1    Jul. 14, 2011

(30) Foreign Application Priority Data

Jul. 8, 2008   (JP) ................. 2008-178459
Aug. 11, 2008  (JP) ................. 2008-207520
Sep. 22, 2008  (JP) ................. 2008-243410

(51) Int. Cl.
*H04L 12/28*   (2006.01)
*H04W 72/04*   (2009.01)
*H04W 88/08*   (2009.01)

(52) U.S. Cl.
CPC .......... *H04W 72/0453* (2013.01); *H04W 88/08* (2013.01)

(58) Field of Classification Search
None
See application file for complete search history.

(56) References Cited

U.S. PATENT DOCUMENTS

2006/0013168 A1   1/2006   Agrawal et al.
2006/0013186 A1   1/2006   Agrawal et al.
(Continued)

FOREIGN PATENT DOCUMENTS

JP   2005-536100 A   11/2005
JP   2008-502225 A    1/2008
WO   2005/122425 A2  12/2005

OTHER PUBLICATIONS

International Search Report w/translation from PCT/JP2009/062337 dated Oct. 20, 2009 (2 pages).
(Continued)

*Primary Examiner* — Chirag Shah
*Assistant Examiner* — Amar Persaud
(74) *Attorney, Agent, or Firm* — Osha Liang LLP

(57) ABSTRACT

To provide a radio base station apparatus and mobile terminal supporting each of a plurality of mobile communication systems when the plurality of mobile communication systems coexists, the radio base station apparatus assigns a modulated signal of a control signal to at least one frequency band with the system band of the LTE system as a unit on a predetermined data block basis (CCE basis) according to a predetermined rule, and when data blocks are assigned according to the rule as shown in FIG. 4(*a*), the mobile terminal demodulates CCEs of the same number in respective frequency bands at a time and thereby determines whether or not the signal is the control signal to the mobile terminal. Meanwhile, when data blocks are assigned according to the rules as shown in FIGS. 4(*b*) and 4(*c*), the mobile terminal demodulates a specific CCE block range in each frequency band, and thereby determines whether or not the signal is the control signal to the mobile terminal.

6 Claims, 15 Drawing Sheets

(56) References Cited

U.S. PATENT DOCUMENTS

| | | | |
|---|---|---|---|
| 2006/0013325 A1 | 1/2006 | Agrawal et al. | |
| 2006/0018269 A1 | 1/2006 | Agrawal et al. | |
| 2006/0018279 A1 | 1/2006 | Agrawal et al. | |
| 2006/0063543 A1* | 3/2006 | Matoba et al. | 455/509 |
| 2006/0063546 A1 | 3/2006 | Fischer | |
| 2008/0285513 A1* | 11/2008 | Jung et al. | 370/329 |
| 2009/0116435 A1* | 5/2009 | Koorapaty et al. | 370/329 |
| 2010/0061345 A1* | 3/2010 | Wengerter et al. | 370/335 |
| 2010/0110958 A1* | 5/2010 | Racz et al. | 370/312 |
| 2010/0298031 A1* | 11/2010 | Han et al. | 455/561 |
| 2012/0258657 A1* | 10/2012 | Scheinert | 455/3.05 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Office Action for Japanese Application No. JP2008-243410 dated Dec. 4, 2012, with English translation thereof (4 pages).

* cited by examiner

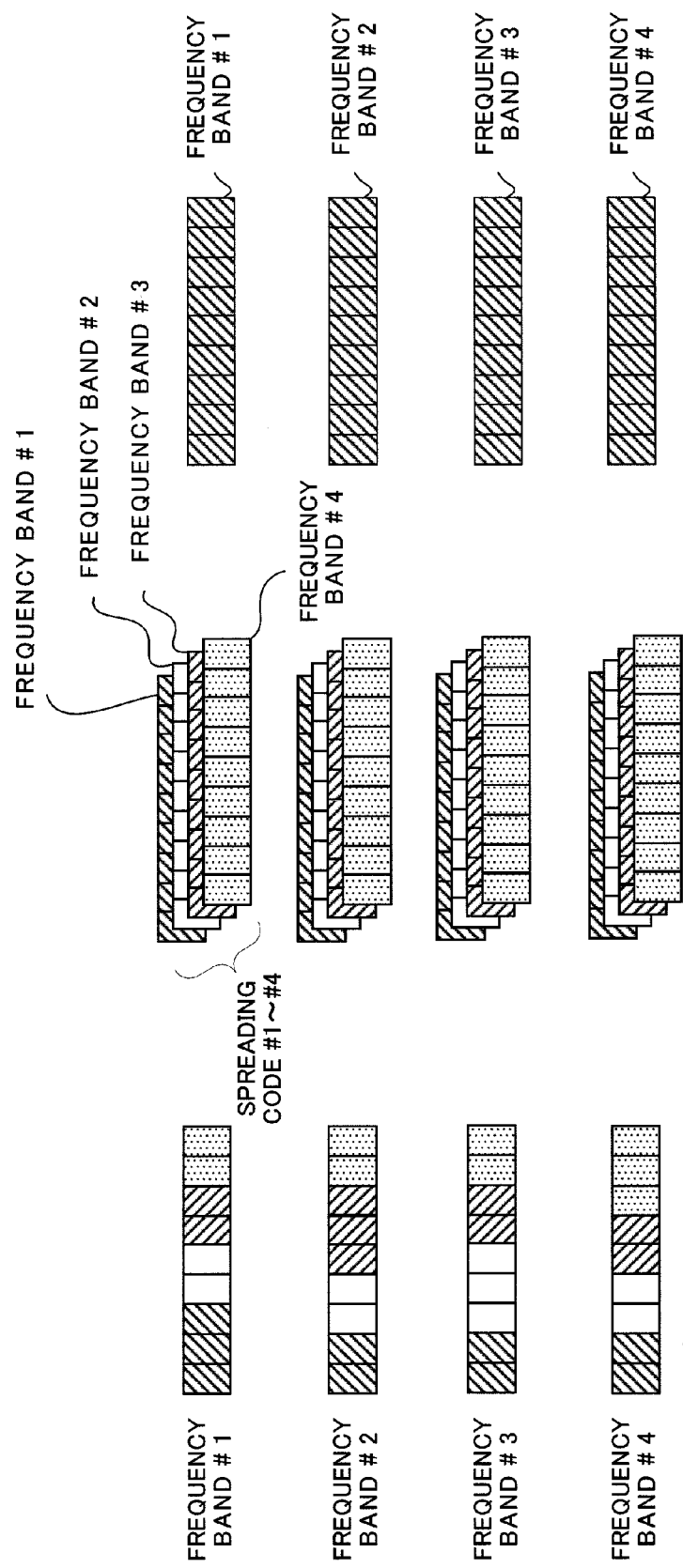

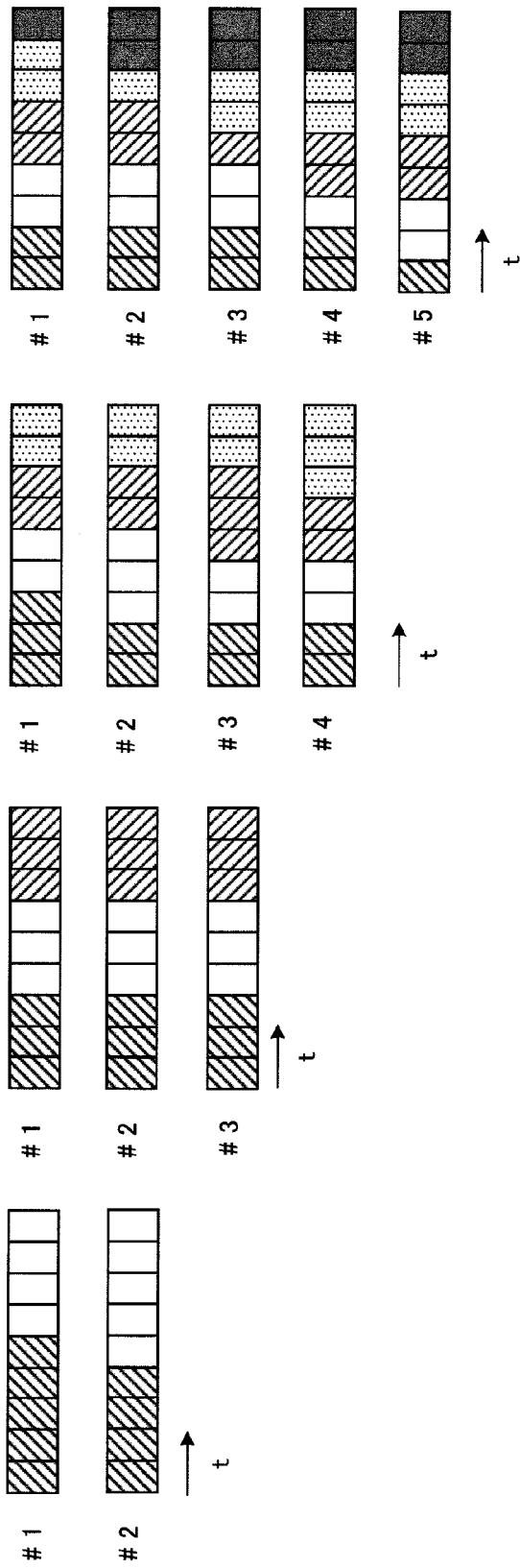

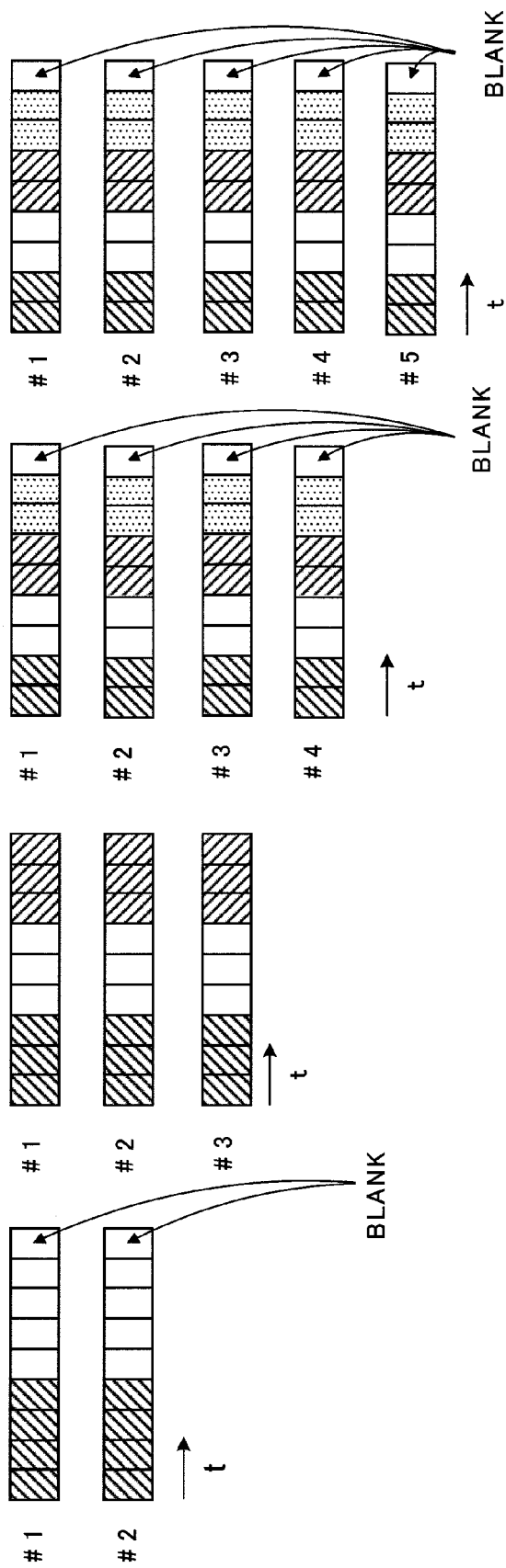

RADIO BASE STATION APPARATUS AND MOBILE TERMINAL

TECHNICAL FIELD

The present invention relates to a radio base station apparatus and mobile terminal in next-generation mobile communication systems.

BACKGROUND ART

In UMTS (Universal Mobile Telecommunication System) networks, for the purpose of improving bandwidth utilization and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). Concerning the UMTS network, for the purpose of further increasing high-speed data rates, providing low delay and the like, Long Term Evolution (LTE) has been discussed (Non-patent Document 1). In LTE, as a multiplex strategy, OFDMA (Orthogonal Frequency Division Multiple Access) different from W-CDMA is used in downlink, and SC-FDMA (Single Carrier Frequency Division Multiple Access) is used in uplink.

In the 3G system, a band of 5 MHz is substantially used, and it is possible to achieve transmission rates of approximately maximum 2 Mbps in downlink. Meanwhile, in the LTE system, using variable band having a range from 1.4 MHz to 20 MHz, it is possible to achieve transmission rates of maximum 300 Mbps in downlink and about 75 Mbps in uplink. Further, in the UMTS network, for the purpose of further increasing the wider bandwidth and high speed, advanced systems to LTE have been discussed (for example, LTE Advancement (LTE-A)). Accordingly, in the future, it is expected that a plurality of these mobile communication systems will overlap, and it is necessary to be capable of supporting a plurality of these systems (radio base station apparatus, user terminal, etc.).

CITATION LIST

Non-Patent Document

Non-patent Document 1
3GPP, TR25. 912 (V7.1.0), "Feasibility study for Evolved UTRA and UTRAN", September 2006

SUMMARY OF THE INVENTION

Technical Problem

The present invention was made in view of the respect, and it is an object of the invention to provide a radio base station apparatus and mobile terminal supporting each of a plurality of mobile communication systems when the plurality of mobile communication systems overlaps.

Solution to Problem

A radio base station apparatus, including a modulation section configured to modulate a control signal of a first mobile communication system with a first system band which is relatively wide, and a control signal of a second mobile communication system with a second system band which is relatively narrow to obtain a modulation signal, a control signal allocating section configured to allocate the modulation signal to at least one frequency band having the second system band as a unit by a data block, according to a predetermined rule, an interleaver configured to interleave the modulation signal for each frequency band, and a mapping section configured to map the interleaved modulation signal to time/frequency domain.

A mobile terminal, including a demapping section configured to demap signals in time/frequency domains, the signal transmitted from a radio base station apparatus, a deinterleaver configured to deinterleave the demapped signals for respectively frequency bands, and a demodulation configured to demodulate the deinterleaved signals according to a predetermined rule and determine a control signal is addressed to the mobile terminal.

Technical Advantage of the Invention

In the invention, the radio base station apparatus allocates a modulated signal to at least one frequency band with a relatively narrow system band as a unit on a predetermined data block basis according to a predetermined rule, and the mobile terminal demodulates the signal according to the predetermined rule, and determines whether or not the signal is the control signal for the mobile terminal. Therefore, in the case where a plurality of mobile communication systems overlap s, it is possible to perform mobile communications in each of the mobile communication systems.

BRIEF DESCRIPTION OF THE DRAWINGS

FIGS. 9(a) to 9(c) are diagrams to explain a multiple method in aspects in FIG. 8;

FIGS. 10(a) to 10(d) are diagrams to explain frequency band allocation in TDM method;

FIGS. 11(a) to 11(d) are diagrams to explain frequency band allocation in TDM method;

DESCRIPTION OF EMBODIMENTS

Figure 1:
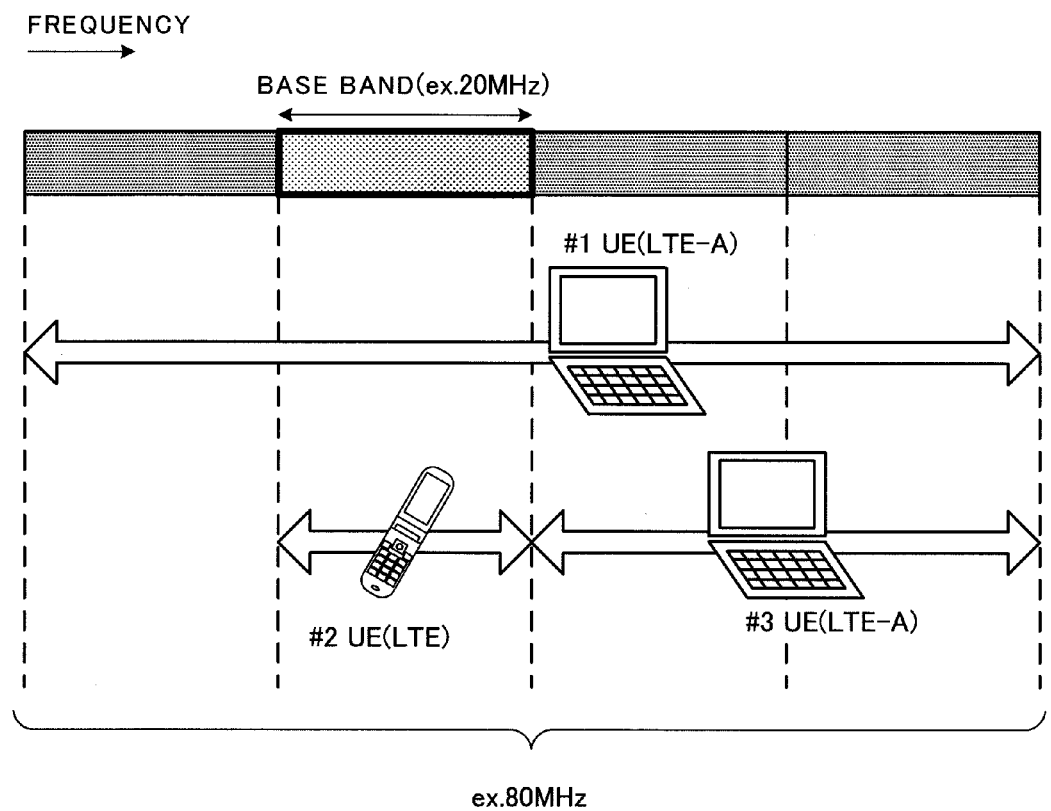
FIG. 1 is a diagram to explain a frequency state when mobile communications are performed in downlink.

FIG. 1 is a diagram to explain a frequency state when mobile communications are performed in downlink. An example as shown in FIG. 1 indicates the frequency state in the case of overlapping of an LTE-A system that is a first mobile communication system having a first system band that is relatively wide, and an LTE system that is a second mobile communication system having a second system band that is relatively narrow. In the LTE-A system, for example, mobile communications are performed in a variable system bandwidth of 80 MHz or less, and in the LTE system, mobile communications are performed in a variable system bandwidth of 20 MHz or less. The system band of the LTE-A system is at least one frequency band having the system band of the LTE system as a unit. In FIG. 1, the system band of the LTE-A system is a system band (20 MHz×4=80 MHz) containing four frequency bands having the system band (base band: 20 MHz) of the LTE system as a unit. In FIG. 1, UE (User Equipment) #1 is a mobile terminal supporting the LTE-A system (also supporting the LTE system), and has a system band of 80 MHz, UE#2 is a mobile terminal supporting the LTE system (not supporting the LTE-A system) and has a system band of 20 MHz (base band), and UE#3 is a mobile terminal supporting the LTE-A system (also supporting the LTE system), and has a system band of 40 MHz (20 MHz×2=40 MHz).

With respect to the invention in which the system band of the LTE-A system is thus divided into system bands including at least one frequency band with the system band of the LTE system as a unit, the Applicant of the present invention already filed the application (Japanese Patent Application No. 2008-88103). In addition, in the LTE-A system, it is not necessary to perform mobile communications using the band of 80 MHz for all the mobile terminal, and a mobile terminal may exist which performs mobile communications using another system band less than 80 MHz, for example, band of 40 MHz.

In the LTE-A system and LTE system, since OFDMA is used in downlink, a transmission signal is mapped to a frequency band within the range of the system band to transmit. Accordingly, in the LTE-A system, mapping is performed in a frequency band with a bandwidth of 80 MHz or less, and in the LTE system, mapping is performed in a frequency band with a bandwidth of 20 MHz or less. In the LTE system, a control signal is mapped to first one, two or three OFDM symbols (IFFT (Inverse Fast Fourier Transform) basis).

In receiving a signal from a radio base station apparatus, the mobile terminal demodulates a control signal addressed to the mobile terminal, and performs control using scheduling information and transmission power control information included in the control signal. In this case, the mobile terminal demaps a signal mapped to the frequency band within the range of the system band of each system, demodulates the demapped signal, and determines whether the signal is the control signal for this mobile terminal. As described above, in the LTE-A system, mapping processing is performed in a frequency band with the bandwidth of 80 MHz or less, and in the LTE system, mapping processing is performed in a frequency band with the bandwidth of 20 MHz or less. In the LTE system, the mobile terminal sequentially demodulates demapped signals in the bandwidth of 20 MHz or less to determine whether the signal is the control signal for this mobile terminal. Meanwhile, in the LTE-A system, when the mobile terminal sequentially demodulates demapped signals in the bandwidth of 80 MHz or less to determine whether the signal is the control signal for this mobile terminal same as the LTE system, the processing time increases significantly, and there is fear that it is not possible to perform reception control promptly.

The inventors of the invention focused on the aforementioned respect, and arrived at the invention. In other words, the subject matter of the invention is that a radio base station apparatus allocates a control signal to a frequency band according to a predetermined rule, a mobile terminal demodulates a signal according to the predetermined rule based on procedures in the LTE system, determines whether or not the signal is a control signal for this mobile terminal, and is thereby capable of promptly acquiring the control signal for this mobile terminal, and that even when a plurality of mobile communication systems (LTE-A system and LTE system) overlaps, mobile communications are performed in each of the mobile communication systems.

Embodiments of the invention will specifically be described below with reference to accompanying drawings.

Figure 2:
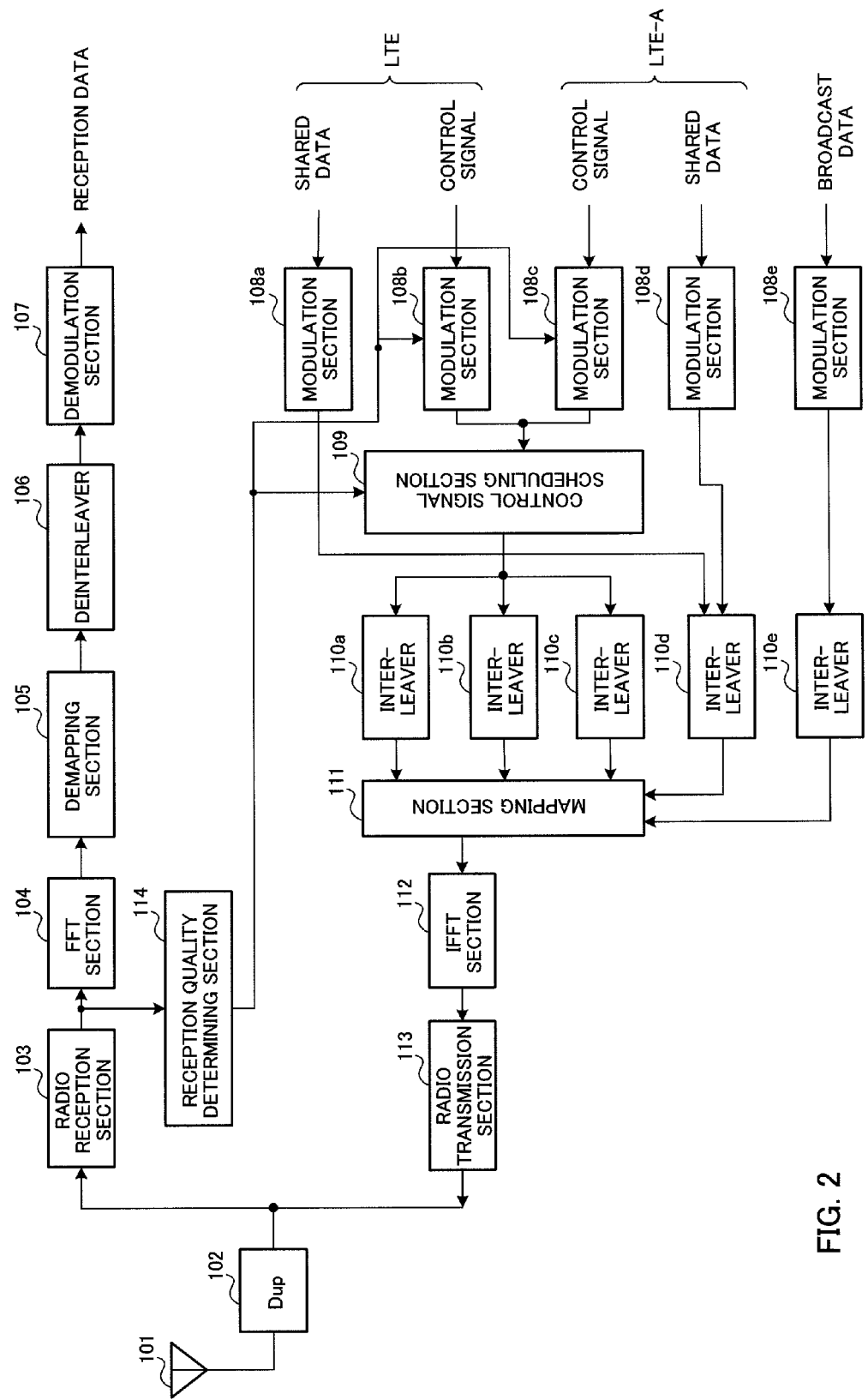
FIG. 2 is a diagram illustrating a schematic configuration of a radio base station apparatus according to Embodiments of the invention.

FIG. 2 is a block diagram illustrating a configuration of the radio base station apparatus according to Embodiments of the invention. The radio base station apparatus as shown in FIG. 2 is principally comprised of an antenna 101 for transmission and reception, duplexer 102, reception processing section, and transmission processing section.

The reception processing section is principally comprised of a radio reception section 103 that performs predetermined reception processing on a signal transmitted from a mobile terminal, an FFT section 104 that performs FFT (Fast Fourier Transform) computing on the received signal, a demapping section 105 that demaps the computed signal, a deinterleaver 106 that deinterleaves the demapped signal, and a demodulation section 107 that demodulates the deinterleaved signal to obtain reception data. Further, the reception processing section has a reception quality determining section 114 which measures quality of the received signal, and based on the measurement result, determines the channel state. In addition, the reception processing section exists for each of mobile terminal, but to simplify the drawing, FIG. 2 shows only the configuration for a single mobile terminal.

The transmission processing section is principally comprised of modulation sections 108a to 108e that modulate data for the mobile terminal to be modulated signals, a control signal scheduling section 109 that is a control signal allocating means for allocating control signals to predetermined frequency bands according to a predetermined rule, interleavers 110a to 110e that interleave the signals allocated to the predetermined frequency bands, a mapping section 111 that maps the interleaved signals to time/frequency domains, an IFFT section 112 that performs IFFT (Inverse Fast Fourier Transform) computing on the mapped signal, and a radio transmission section 113 that performs predetermined transmission processing on the computed signal.

In the radio reception section 103 in the reception processing section, gain control is first performed on the received signal to obtain a baseband signal. Next, the radio reception section 103 performs quadrature detection processing on the baseband signal, removes noise components from the processed signal, and then, performs A/D conversion. The A/D-converted signal is output to the FFT section 104, while being output to the reception quality determining section 114. The reception quality determining section 114 measures reception quality (for example, reception power, SIR (Signal Interference Ratio), etc.) of the baseband signal, and based on the measurement result, determines the channel state between the radio base station apparatus and the mobile terminal. For example, by making a threshold determination on the measurement value of reception quality, the section 114 determines the channel state between the radio base station apparatus and the mobile terminal. The determination result is output to the modulation sections 108b and 108c for control signals and/or control signal scheduling section 109.

The FFT section 104 performs FFT computing on the baseband signal from each of mobile terminal output from the radio reception section 103, and obtains the signal mapped to each subcarrier. This signal is output to the demapping section 105. The demapping section 105 demaps the obtained signal according to a mapping rule on the mobile terminal side. The demapped signal is output to the deinterleaver 106 for each mobile terminal. The deinterleaver 106 deinterleaves the demapped signal. The deinterleaved signal is output to the demodulation section 107 for each mobile terminal. The demodulation section 107 demodulates the deinterleaved signal, and obtains reception data of each mobile terminal.

The modulation sections 108a to 108e in the transmission processing section perform digital modulation on transmission data with a predetermined modulation type, and obtain modulated signals. The modulation section 108a modulates shared data for mobile terminal used in the LTE system. The modulation section 108b modulates a control signal for the mobile terminal used in the LTE system. The modulation section 108c modulates a control signal for mobile terminal for the LTE-A system. The modulation section 108d modulates shared data for the mobile terminal for the LTE-A system. The modulation section 108e modulates information signal (broadcast data) broadcast on a broadcast channel. The modulated signals of the shared data are output to the interleaver 110d. The modulated signals of the control signals are output to the control signal scheduling section 109, and the scheduled control signals are output to the interleavers 110a to 110c. The modulated signal of the broadcast data is output to the interleaver 110e. The modulation sections 108b and 108c may change the modulation type based on the determination result in the reception quality determining section 114. For example, any modulation type with a relatively low rate is selected in a frequency band in the deteriorated channel state.

Figure 3:
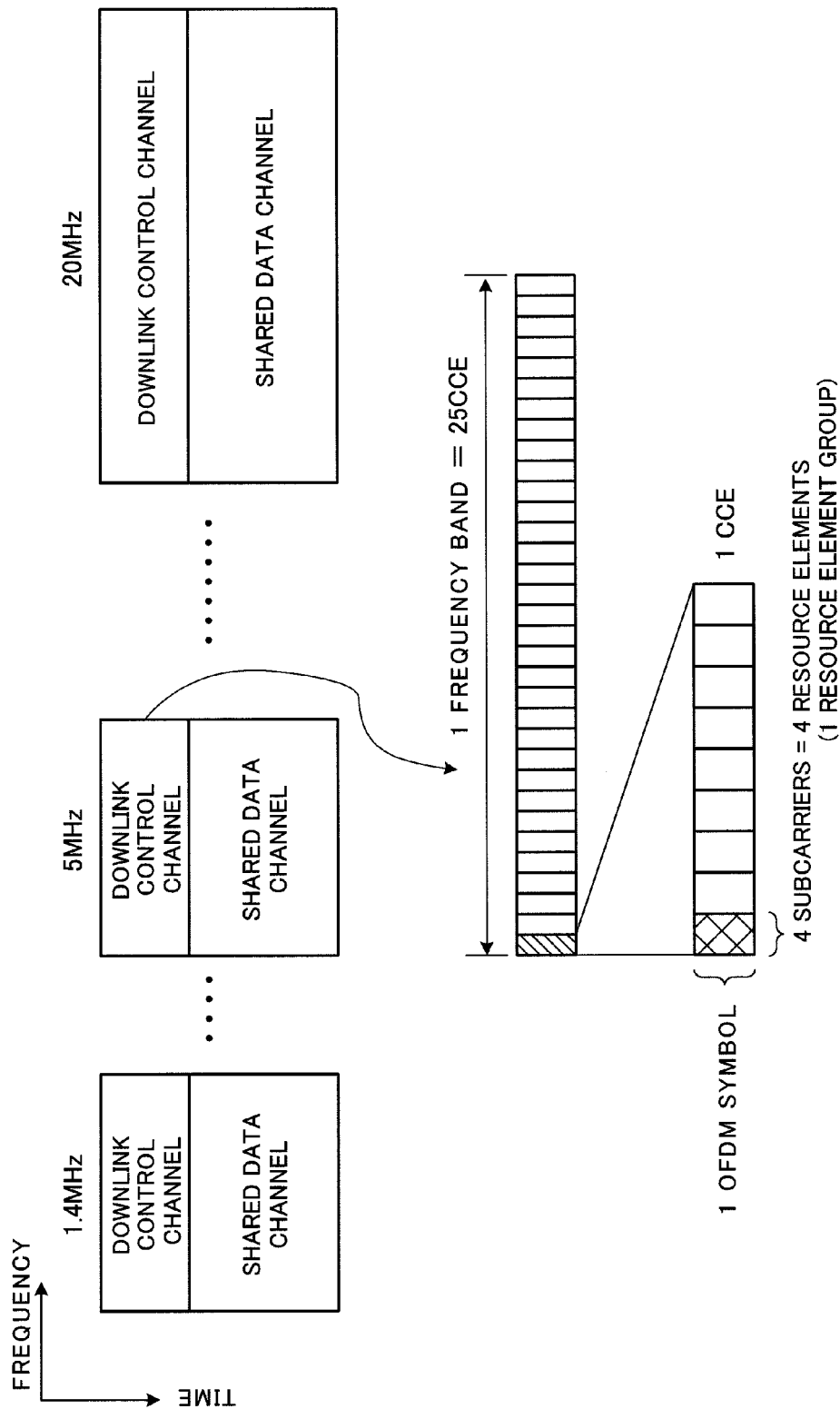
FIG. 3 is a diagram to explain a system band of an LTE system.

Described herein is a system band to which is allocated a control signal of a downlink signal that is transmitted from the radio base station apparatus to the mobile terminal. FIG. 3 is a diagram to explain the system band of the LTE system. As can been seen from FIG. 3, in the LTE system, various system bands (in FIG. 3, 1.4 MHz, 5 MHz, 20 MHz) of 20 MHz or less are used. This system band is appropriately determined, for example, for frequency or each cell. In this system band, mobile communications are performed using the downlink control channel and shared data channel.

A control signal of the downlink control channel is allocated to a plurality of data blocks (herein, 25 data blocks (CCE: Control Channel Element)) as shown in FIG. 3, and one data block (1CCE) is formed by 36 subcarriers×1 OFDM symbol. One subcarrier×one OFDM symbol is referred to as a resource element (RE), and four resource elements are referred to as a single resource element group (REG). This data block configuration is the same when the system bands are different. In other words, a control signal is allocated to a CCE, and the CCE is allocated to the frequency band. Meanwhile, also in the LTE-A system, same as the LTE system, a control signal is allocated to a CCE, and the CCE is allocated to a frequency band of 80 MHz or less that is the system band. Accordingly, referring to FIG. 1 to explain, a control signal for the mobile terminal UE#1 is allocated to a CCE, the CCE is allocated to a 80-MHz band that is the system band, a control signal for the mobile terminal UE#2 is allocated to a CCE, the CCE is allocated to a 20-MHz band that is the system band, a control signal for the mobile terminal UE#3 is allocated to a CCE, and the CCE is allocated to a 40-MHz band that is the system band. In addition, the system band to which the CCE is allocated is a unit of channel coding.

The control signal scheduling section 109 allocates the modulated signal of the control signal to at least one frequency band with the system band of the LTE system as a unit on a predetermined data block basis (on a CCE-by-CCE basis) according to a predetermined rule. For example, the section 109 allocates the control signal to a frequency band of which a unit is 20 MHz that is the maximum system band in the LTE system. Described herein is a case where a control signal is allocated to three frequency bands #1 to #3 each having 20 MHz that is the maximum system band in the LTE system.

Figure 4A:
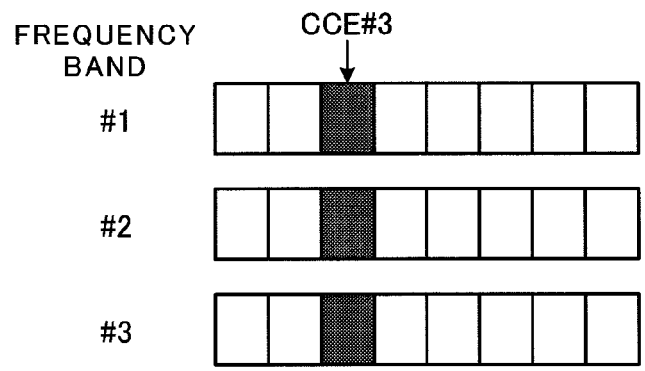
FIGS. 4(a) to 4(c) are diagrams to explain a predetermined rule when a control signal is allocated to a plurality of frequency bands on a data block basis.
Figure 4B:
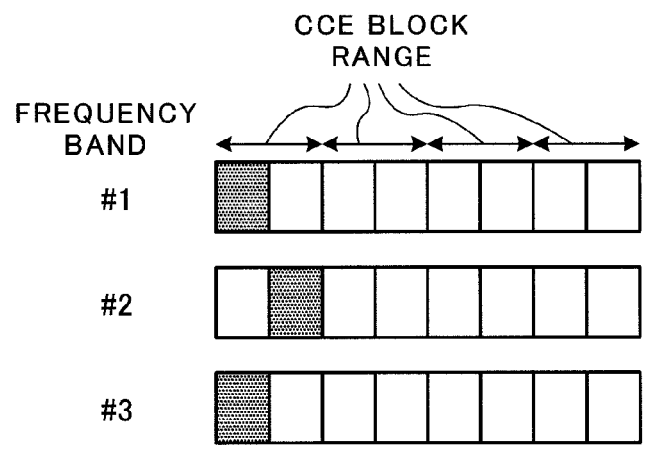
Figure 4C:
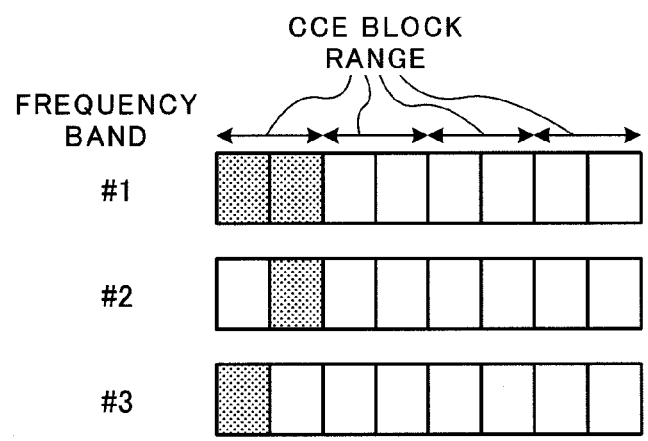

FIGS. 4(a) to 4(c) are diagrams to explain the predetermined rule in the case of allocating a control signal to a plurality of frequency bands on a data block basis. The allocating methods as shown in FIGS. 4(a) to 4(c) are to allocate a data block to a plurality of frequency bands, and therefore, are methods applied in transmission to mobile terminal supporting the LTE-A system. In transmission to mobile terminal supporting the LTE system, the CCE is allocated to a single frequency band.

FIG. 4(a) is a diagram showing the case that the predetermined rule is a rule for allocating a control signal for a specific mobile terminal to a data block of the same number in each frequency band. For example, in this rule, a control signal to some mobile terminal supporting the LTE-A system is allocated to the third CCE (CCE#3) in all the frequency bands. In this case, the CCE for the mobile terminal allocated to a single frequency band is a single CCE.

By allocating a data block to the frequency band according to this rule, in the mobile terminal, all of the CCEs of a specific number in respective frequency bands correspond to the control signal for this mobile terminal. Accordingly, by demodulating the CCEs of the same number in respective frequency bands all at once, it is possible to determine whether or not the signal is the control signal for this mobile terminal. By this means, even when the control signal is allocated to a plurality of frequency bands, the mobile terminal is capable of promptly acquiring the control signal.

FIG. 4(b) is a diagram showing the case that the predetermined rule is a rule for allocating a control signal for a specific mobile terminal to within a data block range indicated by a same number in each frequency band. FIG. 4(b) shows the case where the control signal is allocated to within a plurality of (herein, two) CCE blocks (within a data block range). For example, in this rule, a control signal to some mobile terminal supporting the LTE-A system is allocated to within the CCE block range (in FIG. 4(b), the first CCE block range) in all the frequency bands. In this case, the CCE for the mobile terminal allocated to a single frequency band is a single CCE.

By allocating the data block to the frequency band based on this rule, in the mobile terminal, the control signal for this mobile terminal is included in the specific CCE block range in each frequency band. Accordingly, the mobile terminal performs demodulation in the specific CCE block range in each frequency band, checks whether or not to agree with the ID number assigned to the mobile terminal, and is thereby capable of determining whether or not the signal is the control signal for this mobile terminal. Accordingly, by performing demodulation within the data block range indicated by the same number in each frequency band, even when the control signal is allocated to a plurality of frequency bands, the mobile terminal is capable of promptly acquiring the control signal for this mobile terminal. In such a rule, the flexibility is greater than in the rule as shown in FIG. 4(a).

FIG. 4(c) is a diagram showing the case where the predetermined rule is a rule for allocating a control signal for a specific mobile terminal to within a data block range indicated by the same number in each frequency band, and the number of data blocks to be allocated the control signal is variable within the data block range. FIG. 4(c) shows the case where the control signal is allocated to within a plurality of (herein, two) CCE blocks (within a data block range). For example, in this rule, a control signal to some mobile terminal supporting the LTE-A system is allocated to within the CCE block range (in FIG. 4(c), the first CCE block range) in all the frequency bands. In this case, since the channel state of the frequency band #1 is deteriorated while the channel state of frequency bands #2 and #3 are good, two CCEs are allocated in the frequency band #1, and a single CCE is allocated in the frequency bands #2 and #3.

In addition, whether the channel state in the frequency band is deteriorated or not is based on the determination result in the reception quality determining section 114. Accordingly, the control signal scheduling section 109 determines the number of data blocks to allocate the control signal based on the determination result in the reception quality determining section 114.

By allocating the data block to the frequency band based on this rule, in the mobile terminal, the control signal for this mobile terminal is included in the specific CCE block range in each frequency band. Accordingly, the mobile terminal performs demodulation in the specific CCE block range in each frequency band, and is thereby capable of determining whether or not the signal is the control signal for this mobile terminal. Accordingly, by performing demodulation within the data block range indicated by the same number in each frequency band, even when the control signal is allocated to a plurality of frequency bands, the mobile terminal is capable of promptly acquiring the control signal for this mobile terminal. In this case, two CCEs are allocated to the frequency band #1 in the deteriorated channel state to decrease the transmission rate, and it is thereby possible to improve the reception quality. Accordingly, even when the channel state is partially deteriorated in the frequency bands, it is possible to perform mobile communications with high efficiency. In such a rule, the flexibility is greater than in the rule as shown in FIG. 4(a).

Figure 5:
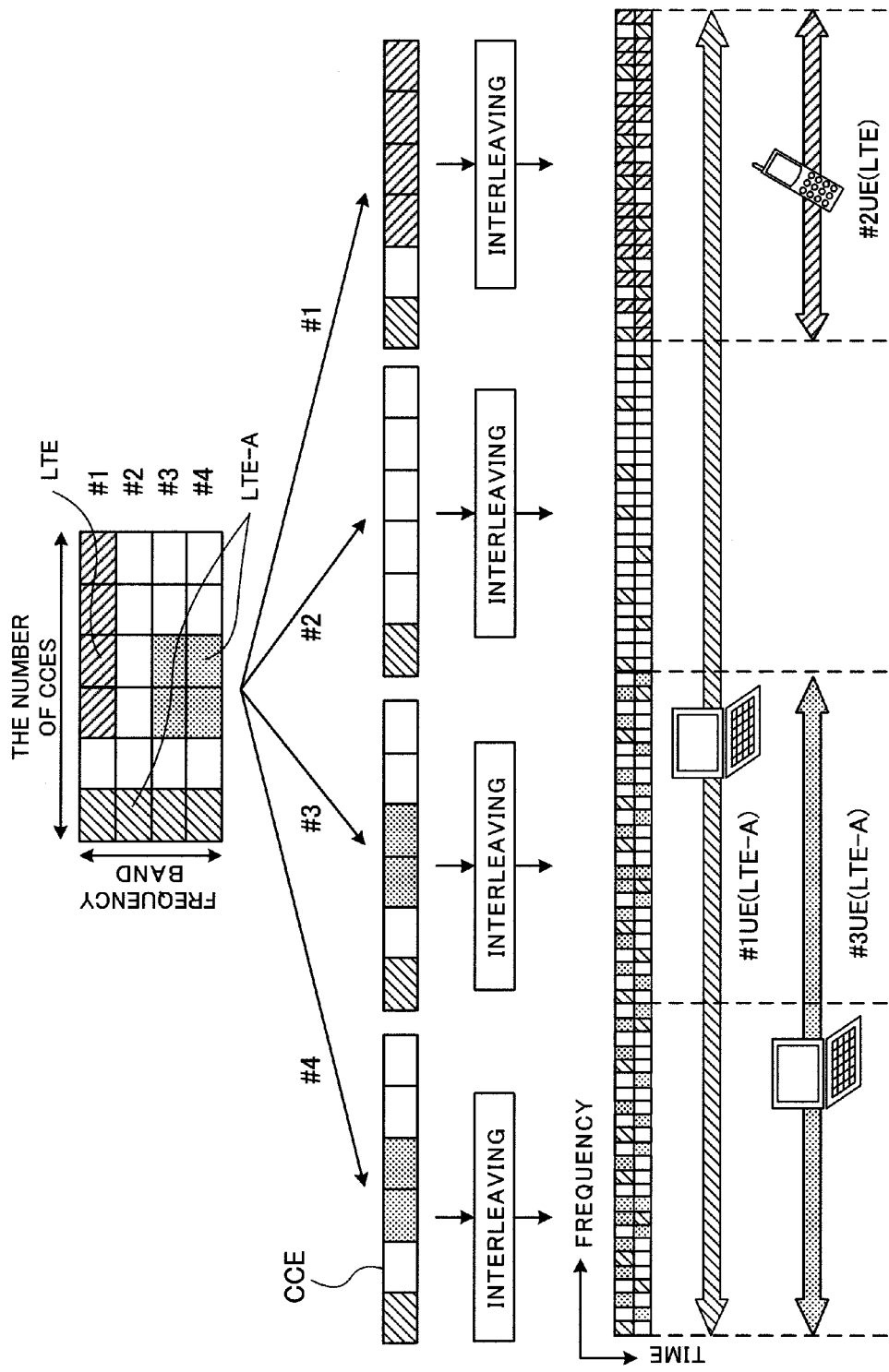
FIG. 5 is a diagram to explain allocation of the control signal to frequency bands.

When the radio base station apparatus allocates a control signal to a plurality of frequency bands on a data block basis, the radio base station apparatus allocates control signals for mobile terminal supporting the LTE-A system and control signals for mobile terminal supporting the LTE system, according to the above-mentioned rule. In this case, as shown in FIG. 5, the control signal scheduling section 109 allocates the control signals for mobile terminal supporting the LTE-A system to frequency bands with the widest band possible so as to achieve the frequency diversity effect, and the control signals for mobile terminal supporting the LTE system to a single frequency band. In other words, the control signal scheduling section 109 allocates a single CCE block of the control signal for #1UE used in the LTE-A system and all control signals (four CCE blocks) for #2UE of the LTE system to the frequency band #1. Further, the section 109 allocates a single CCE block of the control signal for #1UE of the LTE-A system to the frequency band #2. Furthermore, the section 109 allocates a single CCE block of the control signal for #1UE of the LTE-A system and two CCE blocks of the control signal for #3UE of the LTE-A system to the frequency band #3. The section 109 allocates a single CCE block of the control signal for #1UE of the LTE-A system and two CCE blocks of the control signal for #3UE of the LTE-A system to the frequency band #4. Thus, in the radio base station apparatus, it is possible to allocate control signals for mobile terminal supporting the LTE-A system and control signals for mobile terminal supporting the LTE system to the frequency bands.

Figures 6A, 6B:
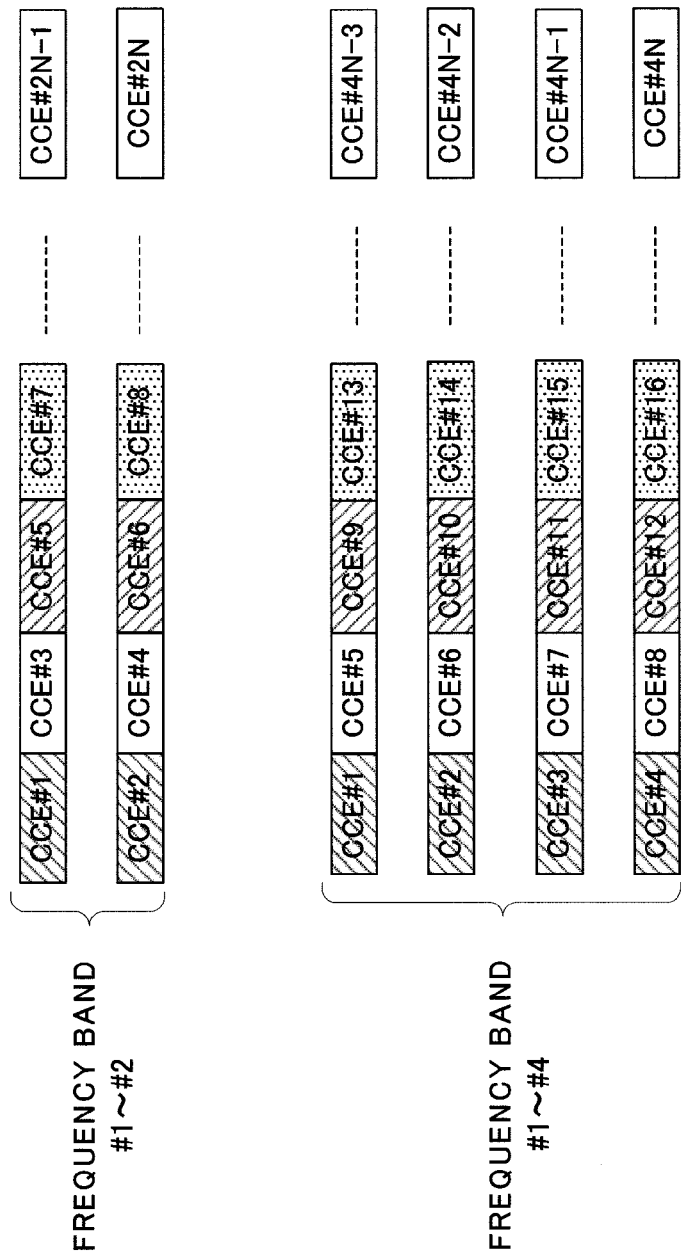
FIGS. 6(a) and 6(b) are diagrams to explain allocation of the control signal to frequency bands.

Further, when the radio base station apparatus allocates control signals to a plurality of frequency bands on a data block basis, it is preferable to give sequence numbers to data blocks and assign the data blocks in ascending order of the sequence number over a plurality of frequency bands. For example, as shown in FIG. 6(a), two data blocks are allocated respectively to two frequency bands #1 and #2. In other words, data blocks CCE#1 and CCE#2 are respectively allocated to the frequency bands #1 and #2, data blocks CCE#3 and CCE#4 are respectively allocated to the frequency bands #1 and #2, data blocks CCE#5 and CCE#6 are respectively allocated to the frequency bands #1 and #2, and data blocks CCE#7 and CCE#8 are respectively allocated to the frequency bands #1 and #2. Further, as shown in FIG. 6(b), four data blocks are allocated respectively to four frequency bands #1 to #4. In other words, data blocks CCE#1 to CCE#4 are respectively allocated to the frequency bands #1 to #4, data blocks CCE#5 to CCE#8 are respectively allocated to the frequency bands #1 to #4, data blocks CCE#9 and CCE#12 are respectively allocated to the frequency bands #1 to #4, and data blocks CCE#13 to CCE#16 are respectively allocated to the frequency bands #1 to #4. In this case, the definition of the CCE that is data block is the same as that described using FIG. 3. In such an allocation method, the frequency diversity effect is obtained when two or more data blocks exit.

Figure 7B:
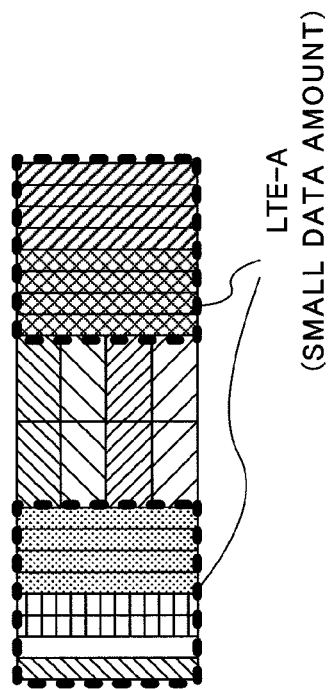
FIGS. 7(a) and 7(b) are diagrams to explain another example of allocation of the control signal to frequency bands.
Figure 7A:
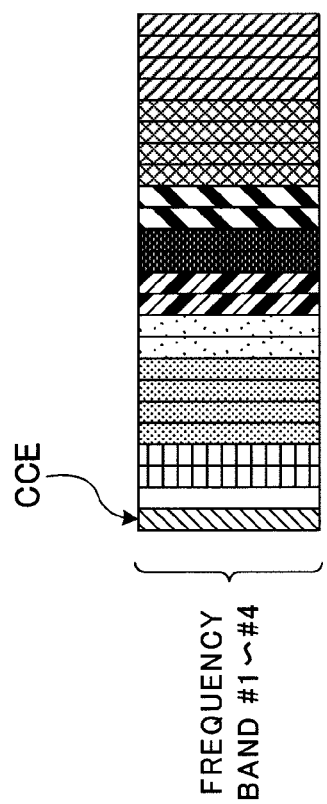

Further, the configuration of the CCE block may be changed as shown in FIGS. 7(a) and 7(b). In this case, since the number of data bits contained in a single CCE block is predetermined, the configuration of the CCE block is changed while the number of data bits is not varied. For example, the frequency range allocated by a single CCE block is extended, and the CCE block range is narrowed. For example, as shown in FIG. 7(a), with respect to the configuration of the CCE block as shown in FIG. 5, the configuration of a single CCE block is made of four times frequency range and ¼ CCE block range. In one CCE block as shown in FIG. 7(a) and one CCE block as shown in FIG. 5, the number of data bits to contain is the same as each other. By constructing the CCE block configuration as shown in FIG. 7(a), even in a control signal of a low number of CCE blocks, it is possible to exert frequency diversity. Further, obviously, as shown in FIG. 7(b), the CCE blocks may be allocated to the frequency range by combining the CCE block configuration as shown in FIG. 5 and the CCE block configuration as shown in FIG. 7(a). In other words, control signals for the LTE-A system with large data amounts are allocated using the CCE block configuration (the central regions in FIG. 7(b)) as shown in FIG. 5, and control signals for the LTE system with small data amounts are allocated using the CCE block configuration (opposite-end regions in FIG. 7(b)) as shown in FIG. 7(a). By this means, it is possible to allocate CCE blocks to frequency bands with efficiency corresponding to data amounts of control signals.

Also in this case, it is preferable to give sequence numbers to data blocks and assign the data blocks over a plurality of frequency bands. For example, as shown in FIG. 8(a), a single data block (CCE) is allocated over two frequency bands, #1 and #2. In this case, the definition of the CCE that is a data block is varied. In other words, since a single CCE is comprised of nine REGs and a single data block is allocated over two frequency bands as shown in FIG. 8(a), four REGs or five REGs are allocated to a single frequency band per CCE.

Figure 8B:
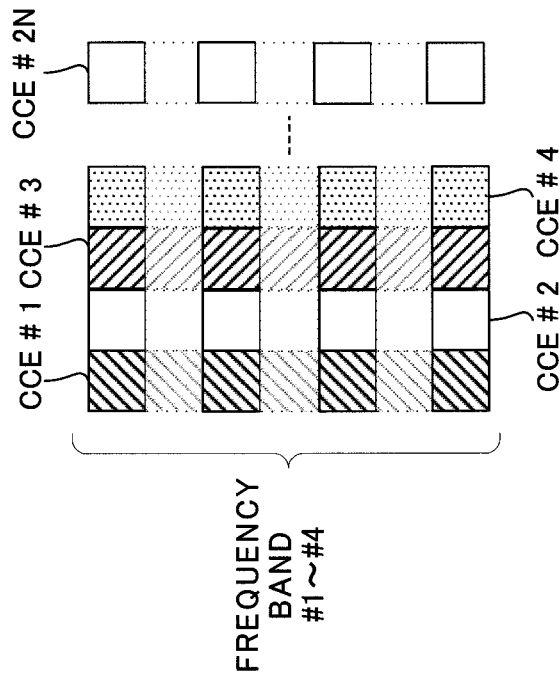
FIGS. 8(a) and 8(b) are diagrams to explain allocation of the control signal to frequency bands.
Figure 8A:
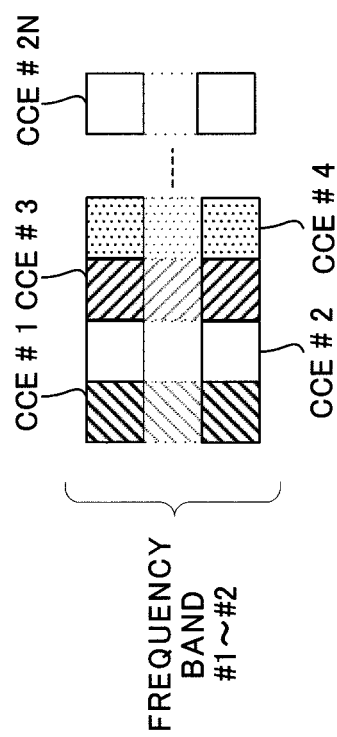

Further, as shown in FIG. 8(b), a single data block (CCE) is allocated over four frequency bands, #1 to #4. Also in this case, the definition of the CCE is varied. In other words, since a single CCE is comprised of nine REGs and a single data block is allocated over four frequency bands as shown in FIG. 8(b), two REGs or three REGs are allocated to a single frequency band per CCE. In such an allocation method, the frequency diversity effect is obtained even in a single data block.

When the definition of the CCE is varied as shown in FIG. 8, for example, there are a Time Division Multiplexing method as shown in FIG. 9(a), Code Division Multiplexing method as shown in FIG. 9(b), a repetition system as shown in FIG. 9(c) and the like.

When the CCE is defined in the TDM method as shown in FIG. 9(a), as described above, since one CCE is comprised of nine REGs, unless the number of frequency bands to allocate is "3", apart of REGs result in fraction. To allocate the REG that is a fraction, considered are a method (first method) for allocating the REG without any modification even when the numbers of REGs allocated to the frequency bands are different from one another among the frequency bands, and another method (second method) in which the number of REGs constituting a single CCE is allocated so that the number of REGs allocated to the frequency band is the same in each frequency band.

In the first method, as shown in FIG. 10(b), when the number of frequency bands to which the REGs are allocated is "3", the number of REGs allocated to each frequency band is the same. Meanwhile, as shown in FIGS. 10(a), 10(c) and 10(d), when the number of frequency bands is numbers except "3", the numbers of REGs allocated to the frequency bands are different from one another. Using the case as shown in FIG. 10(c) as an example, for CCE#1 the number of REGs in the frequency band #1 differs from the number of REGs in each of the other frequency bands, #2, #3 and #4, for CCE#2 the number of REGs in the frequency band #2 differs from the number of REGs in each of the other frequency bands, #1, #3 and #4, for CCE#3 the number of REGs in the frequency band #3 differs from the number of REGs in each of the other frequency bands, #1, #2 and #4, and for CCE#4 the number of REGs in the frequency band #4 differs from the number of REGs in each of the other frequency bands, #1, #2 and #3.

In the second method, as shown in FIGS. 11(a) to 11(d), the number of REGs constituting a single CCE is allocated so that the number of REGs allocated to the frequency band is the same in each frequency band. In the case as shown in FIG. 11(a), the number of REGs constituting a single CCE is set at "4", and the number of REGs allocated to the frequency band is set at the same in each frequency band. In the case as shown in FIG. 11(b), the number of REGs constituting a single CCE is set at "3", and the number of REGs allocated to the frequency band is set at the same in each frequency band. In the cases as shown in FIGS. 11(c) and 11(d), the number of REGs constituting a single CCE is set at "2", and the number of REGs allocated to the frequency band is set at the same in each frequency band. In addition, in the cases as shown in FIGS. 11(a), 11(c) and 11(d), blank REGs exist. In addition, so that there is no blank REG, rate matching may be performed on the CCE in advance.

Figure 12:
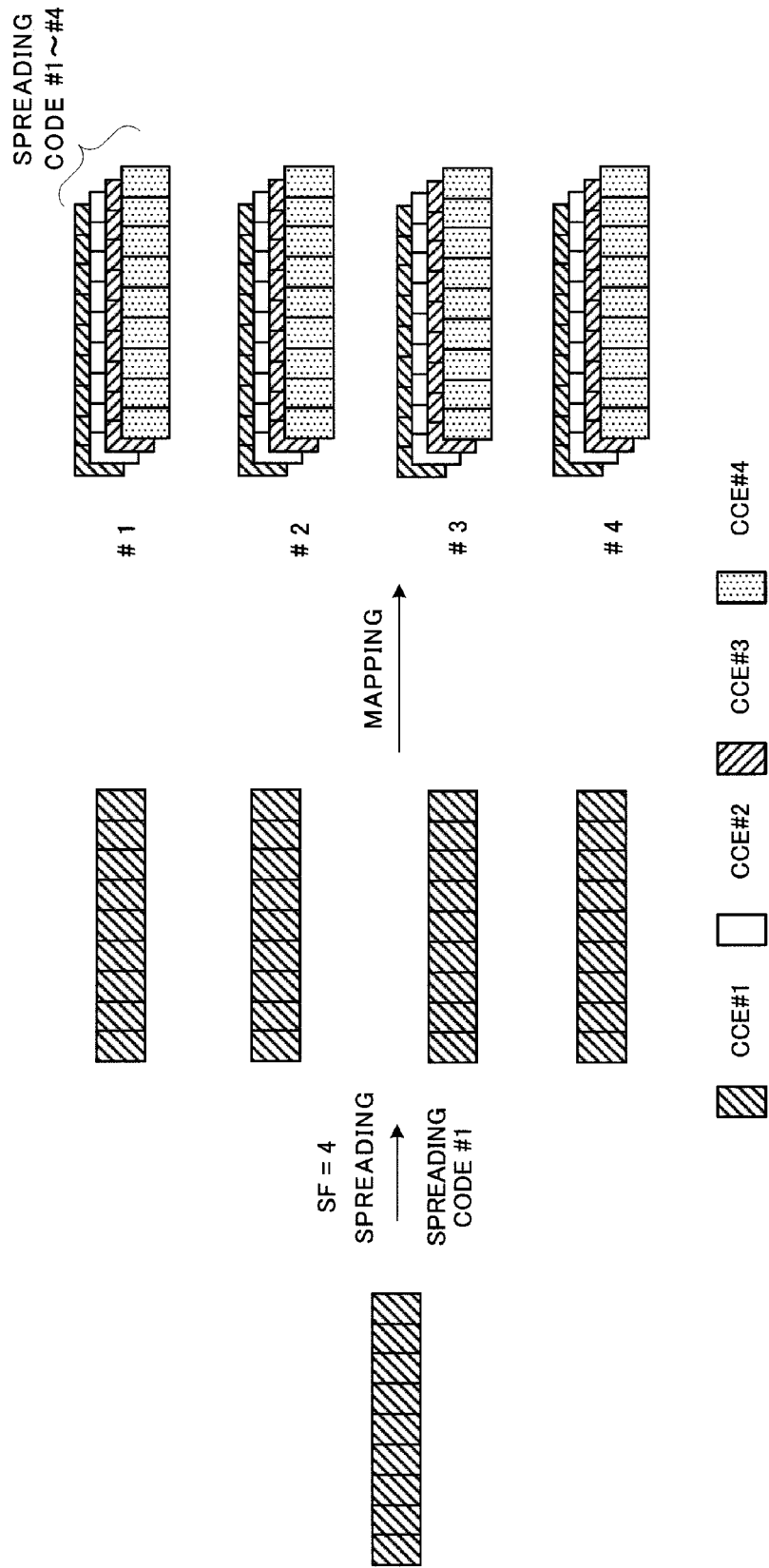
FIG. 12 is a diagram to explain frequency band allocation in CDM method.

When the CCE is defined in the CDM method as shown in FIG. 9(b), as shown in FIG. 12, the CCE (9 REGs) is spread and modulated, and the spread modulated signals are code-multiplexed for mapping. Herein, the spreading factor is "4". In other words, in FIG. 12, the CCE #1 is spread with a spreading code #1, the CCE #2 is spread with a spreading code #2, the CCE #3 is spread with a spreading code #3, and the CCE #4 is spread with a spreading code #4. At this point, since the spreading factor is "4", each CCE is spread to four times. Then, the CCE spread by four times is allocated to frequency bands #1 to #4.

In the case of adopting the CDM method, it is necessary to adopt the system on the condition that orthogonality does not deteriorate by the effect of channel variations in despreading processing. In the LTE system and LTE-A system, interleaving is performed on an REG-by-REG basis and frequency allocation is performed. Since the REG is comprised of four REs (subcarriers), these four subcarriers are interleaved in the state parallel with one another, and allocated frequencies. Accordingly, when spreading is performed in these four subcarriers, orthogonality is maintained. In consideration thereof, the spreading factor may be "2" or "4" that is the factor of "4".

Figure 13:
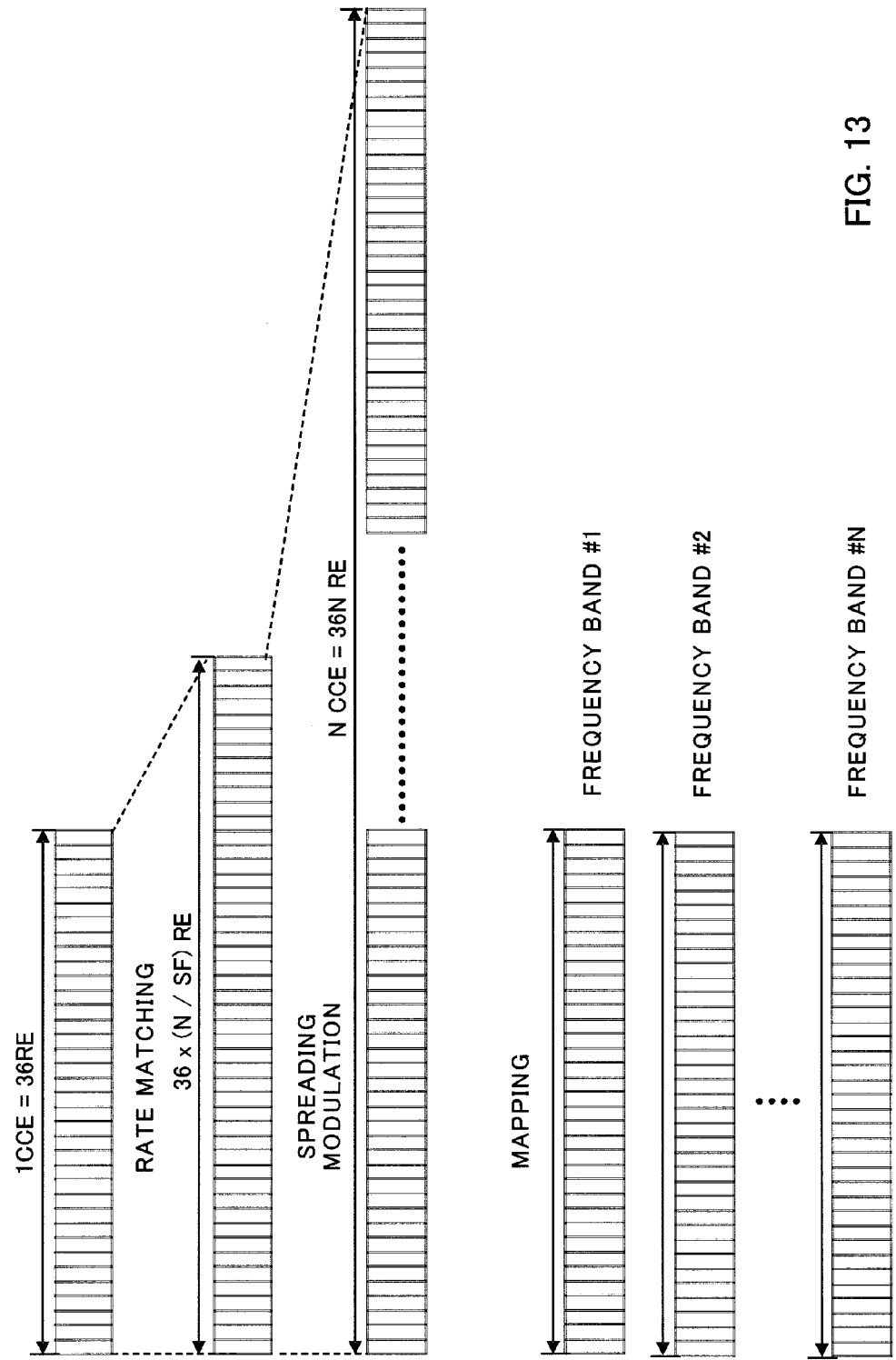
FIG. 13 is another diagram to explain frequency band allocation in CDM method.

Further, in the case of adopting the CDM method, when the CCE is allocated to frequency bands except four frequency bands, for example, it is expected that the CCE is allocated to five or more frequency bands. In this case, as shown in FIG. 13, it is preferable to perform spreading modulation after performing rate matching, and then allocate spread modulated signals to each frequency band. In this case, rate matching is performed using the number (N) of frequency bands to allocate and the spreading factor (SF). In other words, as shown in FIG. 13, when the number of frequency bands to allocate the CCE is N and the spreading factor is SF, rate matching is performed using the coefficient (N/SF). By thus performing rate matching, N-time CCEs are obtained in spreading modulation, and respectively allocated to N frequency bands.

The above-mentioned TDM method and CDM method may be used alone or in combination thereof. For example, when the CCE is allocated to six frequency bands, it is possible to allocate to two frequency bands in the TDM method, and further allocate to remaining four frequency bands in the CDM method.

The modulated signals of signals allocated according to the above-mentioned rule, shared data and broadcast data are output to respective interleavers 110a to 110e. In the interleavers 110a to 110c, interleavings are respectively performed in the frequency bands #1 to #3. The interleaved signal is output to the mapping section 111. In the mapping section 111, the interleaved signal is mapped to time/frequency domains. In addition, in the case of the rules as shown in FIGS. 4(b) and 4(c), mapping in the mapping section 111 is performed for each of the frequency bands #1 to #3. The mapped signal is output to the IFFT section 112.

Further, in the case of adopting the TDM method and CDM method for the allocation of CCE, in performing the above-mentioned rate matching, the control signal scheduling section 109 performs the rate matching processing on the CCE. Further, in the case of adopting the CDM method for the allocation of CCE, the spreading modulation processing is performed on the CCE with rate matching, or the CCE without rate matching. In other words, in the case of adopting the CDM method for the allocation of CCE, the control signal scheduling section 109 performs rate matching, spreading modulation and mapping when necessary.

The IFFT section 112 performs IFFT computing on the mapped signal to be an OFDM signal. The OFDM signal is output to the radio transmission section 113. The radio transmission section 113, gives CP (cyclic prefix) to the OFDM signal, and performs D/A conversion to be a baseband signal, noise components are removed from the signal by a low-pass filter, and the signal is amplified by an amplifier to be a transmission signal. The transmission signal is transmitted through the antenna 101 via the duplexer 102.

In the case of varying the definition of the CCE as described previously, the broadcast data includes at least the assignment frequency bands number (N), indicating the number of frequency bands to which the control signal is to be allocated. For example, in the case of the CDM system, the assignment frequency bands number (N) and the spreading factor (SF) are included in the broadcast data. The mobile terminal receiving the broadcast data on the BCH (Broadcast Channel) performs the despreading processing and demapping using the broadcast data (frequency bands (N) and spreading factor (SF)). In addition, when the spreading factor (SF) is associated with the assignment frequency bands number (N) of assignment frequency regions in advance, only by including the assignment frequency bands number (N) of assignment frequency regions in the broadcast data, the mobile terminal is capable of performing the despreading processing and demapping.

Figure 14:
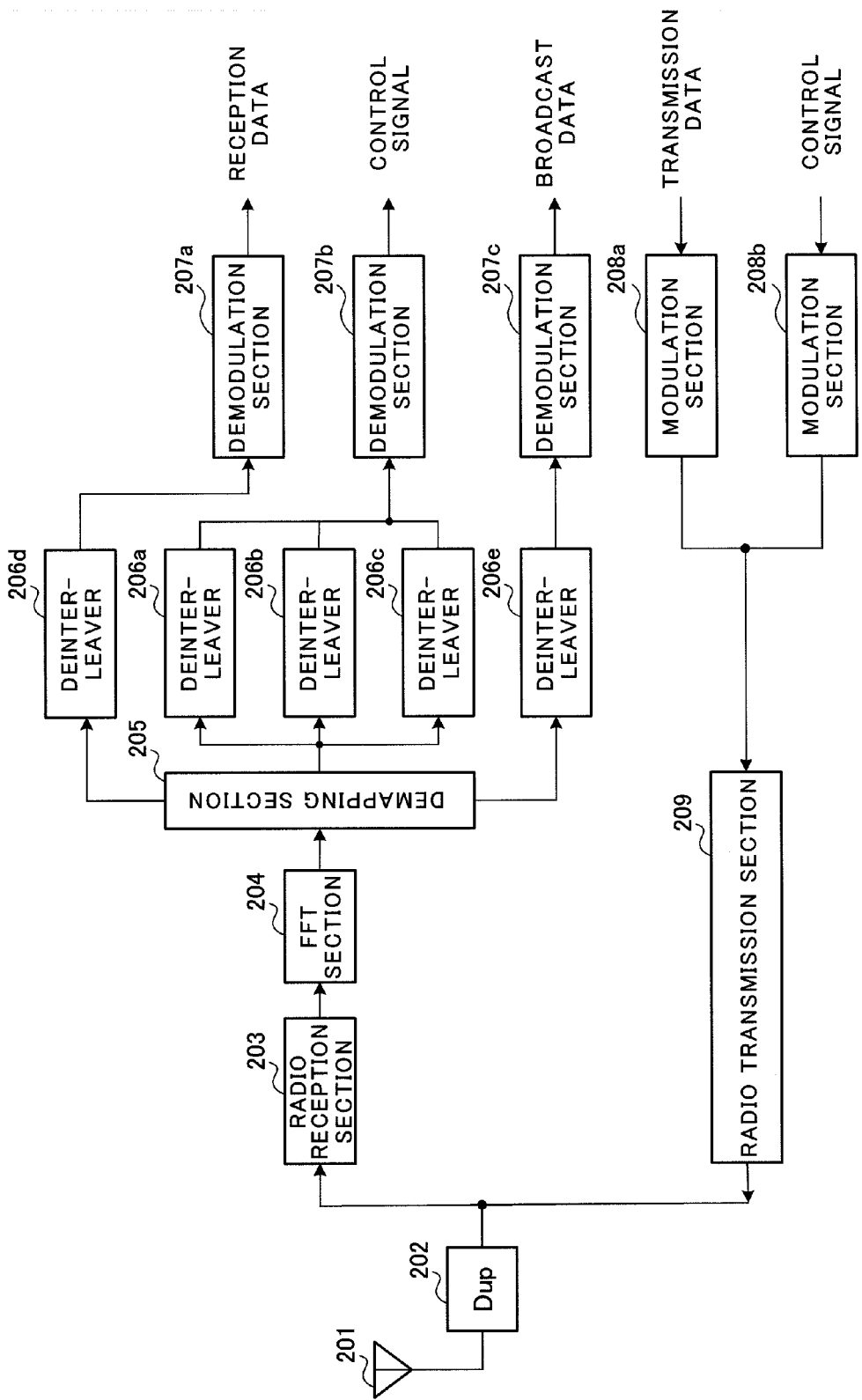
FIG. 14 is a diagram illustrating a schematic configuration of a mobile terminal according to Embodiments of the invention.

FIG. 14 is a block diagram illustrating a configuration of the mobile terminal according to Embodiments of the invention. In addition, the mobile terminal as shown in FIG. 14 is a mobile terminal capable of supporting both of the LTE-A system and the LTE system. The mobile terminal as shown in FIG. 14 is principally comprised of an antenna 201 for transmission and reception, duplexer 202, reception processing section and transmission processing section.

The reception processing section is principally comprised of a radio reception section 203 that performs predetermined reception processing on a signal transmitted from the radio base station apparatus, an FFT section 204 that performs FFT computing on the received signal, a demapping section 205 that demaps the computed signal, deinterleavers 206a to 206e that deinterleave the demapped signal, and demodulation sections 207a to 207c that demodulate the deinterleaved signal to obtain reception data.

The transmission processing section is principally comprised of modulation sections 208a and 208b that modulate data for the radio base station apparatus to be modulated signals, and a radio transmission section 209 that performs predetermined transmission processing on the modulated signal.

In the radio reception section 203 in the reception processing section, gain control is first performed on the received signal, and a baseband signal is obtained. Next, the radio reception section 203 performs quadrature detection processing on the baseband signal, removes noise components from the processed signal, and then, performs A/D conversion. The A/D-converted signal is output to the FFT section 204.

The FFT section 204 performs FFT computing on the baseband signal from the radio base station apparatus output from the radio reception section 203, and obtains the signal allocated to each subcarrier. This signal is output to the demapping section 205. The demapping section 205 performs demapping from time/frequency domains on the obtained signal according to a mapping rule on the radio base station apparatus side. The demapped signal is output to the deinterleavers 206a to 206e for each frequency band. The deinterleavers 206a to 206e deinterleave the demapped signal. The deinterleaved signals are output to the demodulation sections 207a to 207c.

The demodulation section 207a demodulates the deinterleaved signal, and obtains reception data (shared data), and the demodulation section 207b demodulates the deinterleaved signal, and obtains the control signal. The demodulation section 207b performs demodulation according to the predetermined rule, and determines whether or not the signal is the control signal addressed to the mobile terminal. For example, when data blocks are allocated according to the rule as shown in FIG. 4(a), the section 207b demodulates CCEs of the same number in respective frequency bands all at once, and thereby determines the CCEs are the control signal addressed to the mobile terminal. Meanwhile, when data blocks are allocated according to the rules as shown in FIGS. 4(b) and 4(c), the section 207b demodulates a specific CCE block range in each frequency band, and thereby determines the CCE is the control signal addressed to the mobile terminal. Further, the demodulation section 207c demodulates the broadcast data broadcast on the broadcast channel. By this means, the mobile terminal is capable of acquiring the broadcast data including at least the assignment frequency bands number (N), and the demapping section 205 is thereby capable of performing the despreading processing and demapping.

The modulation sections 208a and 208b in the transmission processing section perform digital modulation on transmission data and control signal with a predetermined modulation type, and obtain modulated signals. The modulated signals are output to the radio transmission section 209. The radio transmission section 209 performs predetermined transmission processing on the modulated signal. Thus obtained transmission signal is transmitted through the antenna 201 via the duplexer 202.

Described next are Embodiments in the mobile communication system comprised of the radio base station apparatus and the mobile terminal according to the Embodiment of the invention.

EXAMPLE 1

This Embodiment describes the case where the rule for allocating data blocks is the rule for allocating a control signal for a specific mobile terminal to a data block of the same number in each frequency band. Herein, it is assumed that the control signal for mobile terminal supporting the LTE-A system is included in the data block #3 (CCE #3), the control signal for mobile terminal supporting the LTE system is included in the data block #1 (CCE #1), the system band of the LTE-A system ranges from the frequency band #1 to frequency band #3, and that the system band of the LTE system is the frequency band #2.

First, in the radio base station apparatus, the modulation sections 108c and 108b respectively modulate the control signal of the LTE-A system and the control signal of the LTE system to be modulated signals. The modulated signals are output to the control signal scheduling section 109. The control signal scheduling section 109 allocates the control signal of the LTE-A system to the data block #3 (CCE #3) over the frequency bands #1 to #3, and further allocates the control signal of the LTE system to the data block #1 (CCE #1) of the frequency band #1. The allocated control signals are output to the interleavers 101a to 101c.

Further, in the radio base station apparatus, the modulation sections 108d and 108a respectively modulate the shared data of the LTE-A system and the shared data of the LTE system to be modulated signals. The modulated signals are output to the interleaver 110d.

The interleaver 110a interleaves the control signal allocated to the frequency band #1, and outputs the interleaved control signal to the mapping section 111. The interleaver 110b interleaves the control signal allocated to the frequency band #2, and outputs the interleaved control signal to the mapping section 111. The interleaver 110c interleaves the control signal allocated to the frequency band #3, and outputs the interleaved control signal to the mapping section 111. Accordingly, the control signals of the LTE-A system are interleaved in the interleavers 110a to 110c, and the control signal of the LTE system is interleaved in the interleaver 110b. The interleaved control signals are output to the mapping section 111. The interleaver 110d interleaves the shared data, and outputs the interleaved signal to the mapping section 111. The interleaver 110e interleaves the broadcast data, and outputs the interleaved signal to the mapping section 111.

The mapping section 111 maps the interleaved signals to the time/frequency domains. The mapped signal is output to the IFFT section 112. The IFFT section 112 performs IFFT computing on the mapped signal to be an OFDM signal. The OFDM signal is output to the radio transmission section 113, and subjected to the predetermined transmission processing as described previously to be a transmission signal. The transmission signal is transmitted through the antenna 101 via the duplexer 102.

In the mobile terminal supporting the LTE-A system, the radio reception section 203 performs the predetermined reception processing as described previously on the received signal to be a baseband signal. The baseband signal is output to the FFT section 204, and FFT-computed, and the signal mapped to each subcarrier is obtained. The signal is output to the demapping section 205. The demapping section 205 performs demapping from time/frequency domains on the obtained signal according to a mapping rule on the base station side. The demapped signal is output to the deinterleavers 206a to 206c for the frequency bands #1 to #3, and deinterleaved. The deinterleaved signals are output to the demodulation sections 207a to 207c.

Figure 15:
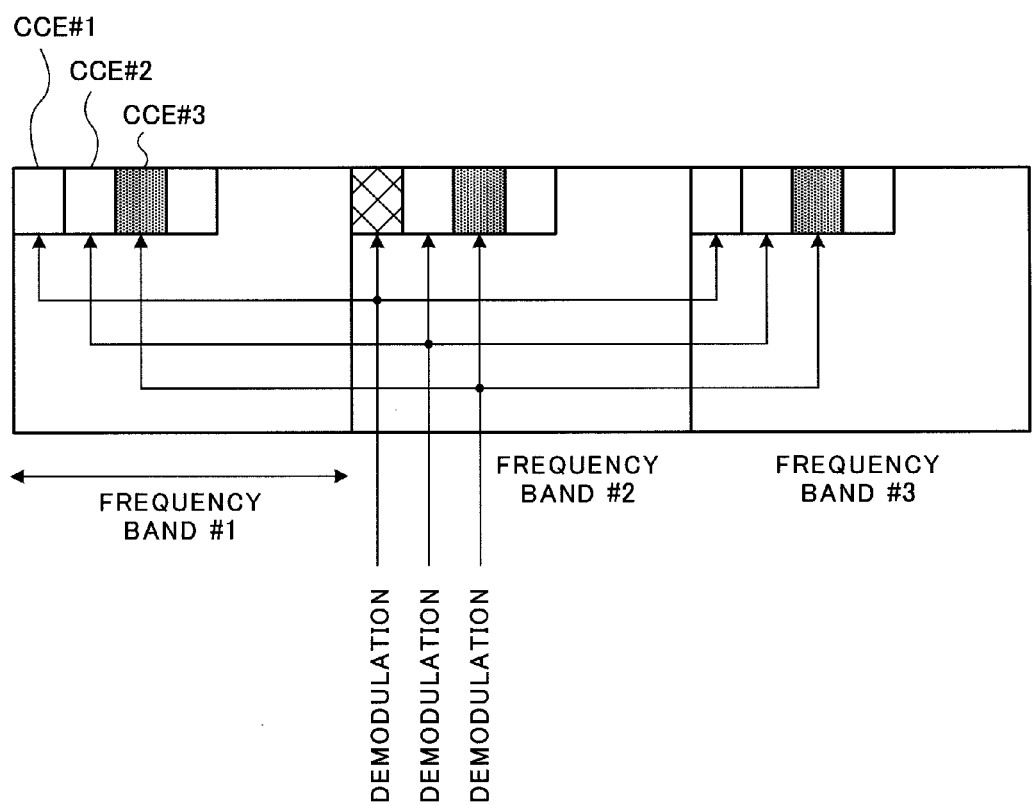
FIG. 15 is a diagram to explain a demodulation process according to a control signal allocation rule in the invention.

The demodulation section 207a demodulates the deinterleaved signal to be the reception data (shared data), the demodulation section 207b demodulates the deinterleaved signal to be the control signal, and the demodulation section 207c demodulates the deinterleaved signal to be the broadcast data. As shown in FIG. 15, the demodulation section 207b demodulates the data blocks (CCEs) of the same number in the frequency bands #1 to #3 all at once. In other words, the section 207b demodulates CCEs #1 in the frequency bands #1 to #3 all at once, next demodulates CCEs #2 in the frequency bands #1 to #3 all at once, and further demodulates CCEs #3 in the frequency bands #1 to #3 all at once. Since the data blocks including the control signals for the mobile terminal are CCEs #3 (black areas in FIG. 15), when the demodulation section 207b demodulates the CCEs #3 of the frequency bands #1 to #3, the section 207b obtains the resultant as the control signal addressed to the mobile terminal. The processing of the shared data is performed using the control signal.

Meanwhile, The mobile terminal, which is supported the LTE system, as in the above-mentioned description, performs the predetermined reception processing on the received signal, performs FFT computing, demaps and deinterleaves, and the deinterleaved signal is output to the demodulation section. The demodulation section demodulates the deinterleaved signal to obtain the control signal. The demodulation section sequentially demodulates data blocks (CCEs) in the frequency band #2. In other words, the demodulation section demodulates the CCE #1 in the frequency band #2, next demodulates the CCE #2 in the frequency band #2, and further demodulates the CCE #3 in the frequency band #2. Since the data block including the control signal addressed to the mobile terminal is the CCE #1 (the diagonally shaded area in FIG. 15), when the demodulation section demodulates the CCE #1 of the frequency band #2, the section obtains the resultant as the control signal addressed to the mobile terminal. The processing of the shared data is performed using the control signal.

Thus, in this Embodiment, the mobile terminal demodulates CCEs of the same number in respective frequency bands all at once, is thereby capable of determining whether or not the signal is the control signal addressed to the mobile terminal, and is thus able to promptly acquire the control signal addressed to the mobile terminal even when the control signal is allocated to a plurality of frequency bands. In addition, the mobile terminal is capable of acquiring the data block number (CCE #N) including the control signal of the mobile terminal before starting communications with the radio base station apparatus, by the broadcast channel (BCH) broadcast by the radio base station apparatus.

EXAMPLE 2

The radio base station apparatus transmits the shared data and control signal to the mobile terminal as in Embodiment 1 except that the control signal scheduling section 109 uses the control signal allocation rule of the LTE-A system as shown in FIG. 4(b), and that mapping is performed for each of the frequency bands #1 to #3.

The mobile terminal, which is supported the LTE-A system, as in Embodiment 1, performs the predetermined reception processing on the received signal, performs FFT computing, demaps and deinterleaves, and the deinterleaved signal is output to the demodulation section. The demodulation section demodulates a specific data block range (CCE block range) in each frequency band. In other words, the demodulation section first demodulates the CCE block range of the CCE #1 and CCE #2 in the frequency bands #1 to #3, next demodulates the CCE block range of the CCE #3 and CCE #4 in the frequency bands #1 to #3, and further demodulates the CCE block range of the CCE #5 and CCE #6 in the frequency bands #1 to #3. Since the data blocks including the control signals for the mobile terminal are the CCE block range of CCE #1 and CCE #2 (the control signal is included in the CCE #1 in the frequency bands #1 and #3 while being included in the CCE #2 in the frequency band #2), when the demodulation section demodulates the CCE #1 and CCE #2 of the frequency bands #1 to #3, the demodulation section obtains the resultant as the control signal addressed to the mobile terminal. The processing of the shared data is performed using the control signal.

Thus, in this Embodiment, the mobile terminal demodulates the specific data block range in each frequency band, is thereby capable of determining whether or not the signal is the control signal addressed to the mobile terminal, and is thus able to promptly acquire the control signal addressed to the mobile terminal even when the control signal is allocated to a plurality of frequency bands. In this Embodiment, the system has more flexibility than in Embodiment 1. In addition, the mobile terminal is capable of acquiring the data block range including the control signal of the mobile terminal before starting communications with the radio base station apparatus, by the broadcast channel (BCH) broadcast by the radio base station apparatus.

EXAMPLE 3

The radio base station apparatus transmits the shared data and control signal to the mobile terminal as in Embodiment 1 except that the control signal scheduling section 109 uses the control signal allocation rule of the LTE-A system as shown in FIG. 4(c), and that mapping is performed for each of the frequency bands #1 to #3.

The mobile terminal, which is supported the LTE-A system, as in Embodiment 1, performs the predetermined reception processing on the received signal, performs FFT computing, demaps and deinterleaves, and the deinterleaved signal is output to the demodulation section. The demodulation section demodulates a specific data block range (CCE block range) in each frequency band. In other words, the demodulation section first demodulates the CCE block range of the CCE #1 and CCE #2 in the frequency bands #1 to #3, next demodulates the CCE block range of the CCE #3 and CCE #4 in the frequency bands #1 to #3, and further demodulates the CCE block range of the CCE #5 and CCE #6 in the frequency bands #1 to #3. Since the data blocks including the control signals for the mobile terminal are the CCE block range of CCE #1 and CCE #2 (the control signal is included in the CCE #1 and CCE #2 in the frequency band #1, included in the CCE #2 in the frequency band #2, and included in the CCE #1 in the frequency band #3), when the demodulation section demodulates the CCE #1 and CCE #2 of the frequency bands #1 to #3, the demodulation section obtains the resultant as the control signal addressed to the mobile terminal. The processing of the shared data is performed using the control signal. In addition, the channel state of the frequency band #1 is deteriorated, and therefore, the mobile terminal demodulates both of the CCE #1 and CCE #2, further demodulates the CCE #2 in the frequency band #2 and the CCE #1 in the frequency band #3, and obtains the control signal addressed to the mobile terminal from the resultant.

Thus, in this Embodiment, the mobile terminal demodulates the specific data block range in each frequency band, is thereby capable of determining whether or not the signal is the control signal addressed to the mobile terminal, and is thus able to promptly acquire the control signal addressed to the mobile terminal even when the control signal is allocated to a plurality of frequency bands. In this Embodiment, the system has more flexibility than in Embodiment 1. Further, in this Embodiment, two CCEs are allocated to the frequency band #1 in the deteriorated channel state to decrease the transmission rate, and it is thereby possible to improve the reception quality. Accordingly, even when the channel state is partially deteriorated in the frequency bands, it is possible to perform mobile communications with high efficiency. In addition, the mobile terminal is capable of acquiring the data block range including the control signal of the mobile terminal before starting communications with the radio base station apparatus, by the broadcast channel (BCH) broadcast by the radio base station apparatus.

Thus, according to the invention, when a plurality of mobile communication systems exits, it is possible to support each of the mobile communication systems. Particularly, the radio base station apparatus allocates a modulated signal of the control signal to at least one frequency band with the system band of the LTE system as a unit on a predetermined data block basis (CCE basis) according to a predetermined rule, and the mobile terminal demodulates the signal according to the predetermined rule, thereby determines whether or not the signal is the control signal addressed to the mobile terminal, and therefore, even when the control is allocated to a plurality of frequency bands, is able to promptly acquire the control signal addressed to the mobile terminal.

INDUSTRIAL APPLICABILITY

The present invention is not limited to the above-mentioned Embodiments, and is capable of being carried into practice with modifications thereof as appropriate. For example, the Embodiments describe the case where the shared data is interleaved on the transmission side to transmit, and is deinterleaved on the reception side, but the invention is not limited to the case, and is applicable similarly to the case where the shared data is not interleaved. Further, without departing from the scope of the invention, the data block allocation rules, the numbers of processing sections, processing procedures, the numbers of frequency bands and data blocks, and data block ranges are capable of being carried into practice with modifications thereof as appropriate. Furthermore, the invention is capable of being carried into practice with modifications thereof as appropriate without departing from the scope of the invention.

The invention claimed is:

1. A radio base station apparatus comprising:
a modulation section configured to modulate a control signal of a first mobile communication system with a first system band, and a control signal of a second mobile communication system with a second system band which is relatively narrower than the first system band to obtain a modulation signal;
a control signal allocating section configured to allocate the modulation signal to a control channel element (CCE) of at least one frequency band having the second system band as a unit, according to a predetermined rule;
an interleaver configured to interleave the modulation signal for each frequency band; and
a mapping section configured to map the interleaved modulation signal to time/frequency domain,
wherein the first mobile communication system and the second mobile communication system overlap,
CCEs of each frequency band are assigned with respective numbers,
the predetermined rule is a rule for allocating a control signal for a specific mobile terminal, to a CCE having a same number in each frequency band or a rule for allocating a control signal for a specific mobile terminal, to a CCE within a CCE range indicated by a same number in each frequency band,
when the control signal for the specific mobile terminal is allocated to the control channel element (CCE) within the CCE range indicated by the same number in each frequency band, a number of CCEs to allocate the control signal is variable within the CCE range.

2. The radio base station apparatus according to claim 1, wherein, when the control signal for the specific mobile terminal is allocated to the control channel element (CCE) within the CCE range indicated by the same number in each frequency band, the mapping section is configured to perform mapping for each frequency band.

3. The radio base station apparatus according to claim 1, further comprising:
a quality determining section configured to determine reception quality of a signal from a mobile terminal,
wherein the control signal allocating section determines the number of CCEs to allocate the control signal, in correspondence to the reception quality determined by the quality determining section.

4. A mobile terminal comprising:
a demapping section configured to demap signals in time/frequency domains, the signals being transmitted from a radio base station apparatus;
a deinterleaver configured to deinterleave the demapped signals for respectively frequency bands; and a demodulation section configured to demodulate the deinterleaved signals according to a predetermined rule, and to determine whether a control signal is addressed to the mobile terminal, wherein the deinterleaved signals are modulation signals of a control signal of a first mobile communication system with a first system band and a control signal of a second mobile communication system with a second system band which is relatively narrower than the first system band, and the first mobile communication system and the second mobile communication system overlap, each of the modulation signals is allocated to a control channel element (CCE) of at least one frequency band having the second system band as a unit, CCEs of each frequency band being assigned with respective numbers, the predetermined rule is a rule in which the mobile terminal demodulates CCEs having a same number in respective frequency bands all at once, and determines whether a control signal is addressed to the mobile terminal or a rule in which the mobile terminal demodulates CCEs within a CCE range indicated by a same number in each frequency band, and determines whether a control signal is addressed to the mobile terminal, and when the control signal for the specific mobile terminal is allocated to the control channel element (CCE) within the CCE range indicated by the same number in each frequency band, a number of CCEs to allocate the control signal is variable within the CCE range.

5. A mobile communication system comprising:
a radio base station apparatus having:
   a modulation section configured to modulate a control signal of a first mobile communication system with a first system band, and a control signal of a second mobile communication system with a second system band which is relatively narrower than the first system band to obtain modulation signals;
   a control signal allocating section configured to allocate each of the modulated signals to a control channel element (CCE) of at least one frequency band with the second system band as a unit, according to a predetermined rule;
   an interleaver configured to interleave each of the modulated signals for each frequency band; and
   a mapping section configured to map the interleaved modulation signals to time/frequency domains; and a mobile terminal having:
   a demapping section configured to demap signals in time/frequency domains, signals being transmitted from the radio base station apparatus;
   a deinterleaver configured to deinterleave the demapped signals for respectively frequency bands; and
   a demodulation section configured to demodulate the deinterleaved signals according to a predetermined rule, and to determine whether a control signal is addressed to the mobile terminal, wherein the first mobile communication system and the second mobile communication system overlap, CCEs of each frequency band are assigned with respective numbers, the predetermined rule is a rule for allocating a control signal for a specific mobile terminal, to a CCE having a same number in each frequency band or a rule for allocating a control signal for a specific mobile terminal, to a CCE within a CCE range indicated by a same number in each frequency band, and when the control signal for the specific mobile terminal is allocated to the control channel element (CCE) within the CCE range indicated by the same number in each frequency band, a number of CCEs to allocate the control signal is variable within the CCE range.

6. The radio base station apparatus according to claim 5, further comprising:
a quality determining section configured to determine reception quality of a signal from a mobile terminal,
wherein the control signal allocating section determines the number of CCEs to allocate the control signal, in correspondence to the reception quality determined by the quality determining section.

\* \* \* \* \*